(12) United States Patent
Winterfeld et al.

(10) Patent No.: US 11,194,709 B2
(45) Date of Patent: Dec. 7, 2021

(54) ASYNCHRONOUS POWER LOSS RECOVERY FOR MEMORY DEVICES

(71) Applicant: Micron Technology, Inc., Boise, ID (US)

(72) Inventors: Michael Winterfeld, Firestone, CO (US); Steven S. Williams, Longmont, CO (US); Alex J. Wesenberg, Erie, CO (US); Johnny A. Lam, Firestone, CO (US)

(73) Assignee: MICRON TECHNOLOGY, INC., Boise, ID (US)

( * ) Notice: Subject to any disclaimer, the term of this patent is extended or adjusted under 35 U.S.C. 154(b) by 86 days.

(21) Appl. No.: 16/800,225

(22) Filed: Feb. 25, 2020

(65) Prior Publication Data

US 2021/0200670 A1 Jul. 1, 2021

Related U.S. Application Data

(60) Provisional application No. 62/955,042, filed on Dec. 30, 2019.

(51) Int. Cl.
*G06F 12/00* (2006.01)
*G06F 12/02* (2006.01)
*G06F 12/0882* (2016.01)
*G06F 1/30* (2006.01)
*G06F 11/30* (2006.01)

(52) U.S. Cl.
CPC ............ *G06F 12/0246* (2013.01); *G06F 1/30* (2013.01); *G06F 11/3037* (2013.01); *G06F 11/3058* (2013.01); *G06F 12/0253* (2013.01); *G06F 12/0882* (2013.01); *G06F 2212/1021* (2013.01); *G06F 2212/7201* (2013.01); *G06F 2212/7207* (2013.01)

(58) Field of Classification Search
CPC ............ G06F 12/0246; G06F 12/0253; G06F 12/0882; G06F 1/30; G06F 11/3037; G06F 11/3058; G06F 2212/1021; G06F 2212/7201; G06F 2212/7207
See application file for complete search history.

(56) References Cited

U.S. PATENT DOCUMENTS

2019/0235762 A1* 8/2019 Kaburaki ............ G06F 12/0864

* cited by examiner

*Primary Examiner* — Shawn X Gu
(74) *Attorney, Agent, or Firm* — Lowenstein Sandler LLP

(57) ABSTRACT

An example memory sub-system includes a memory device and a processing device, operatively coupled to the memory device. The processing device is configured to maintain a logical-to-physical (L2P) table, wherein a region of the L2P table is cached in a volatile memory; maintain a write count reflecting a number of bytes written to the memory device; maintain a cache miss count reflecting a number of cache misses with respect to a cache of the L2P table; responsive to determining that a value of a predetermined function of the write count and the cache miss count exceeds a threshold value, copy the region of the L2P table to a non-volatile memory.

20 Claims, 6 Drawing Sheets

ASYNCHRONOUS POWER LOSS RECOVERY FOR MEMORY DEVICES

REFERENCE TO RELATED APPLICATION

This application claims the benefit of U.S. Provisional Patent Application No. 62/955,042, filed Dec. 30, 2019, the entirety of which is incorporated herein by reference.

TECHNICAL FIELD

Embodiments of the disclosure are generally related to memory sub-systems, and more specifically, are related to asynchronous power loss recovery for memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of some embodiments of the disclosure.

DETAILED DESCRIPTION

Figure 1:
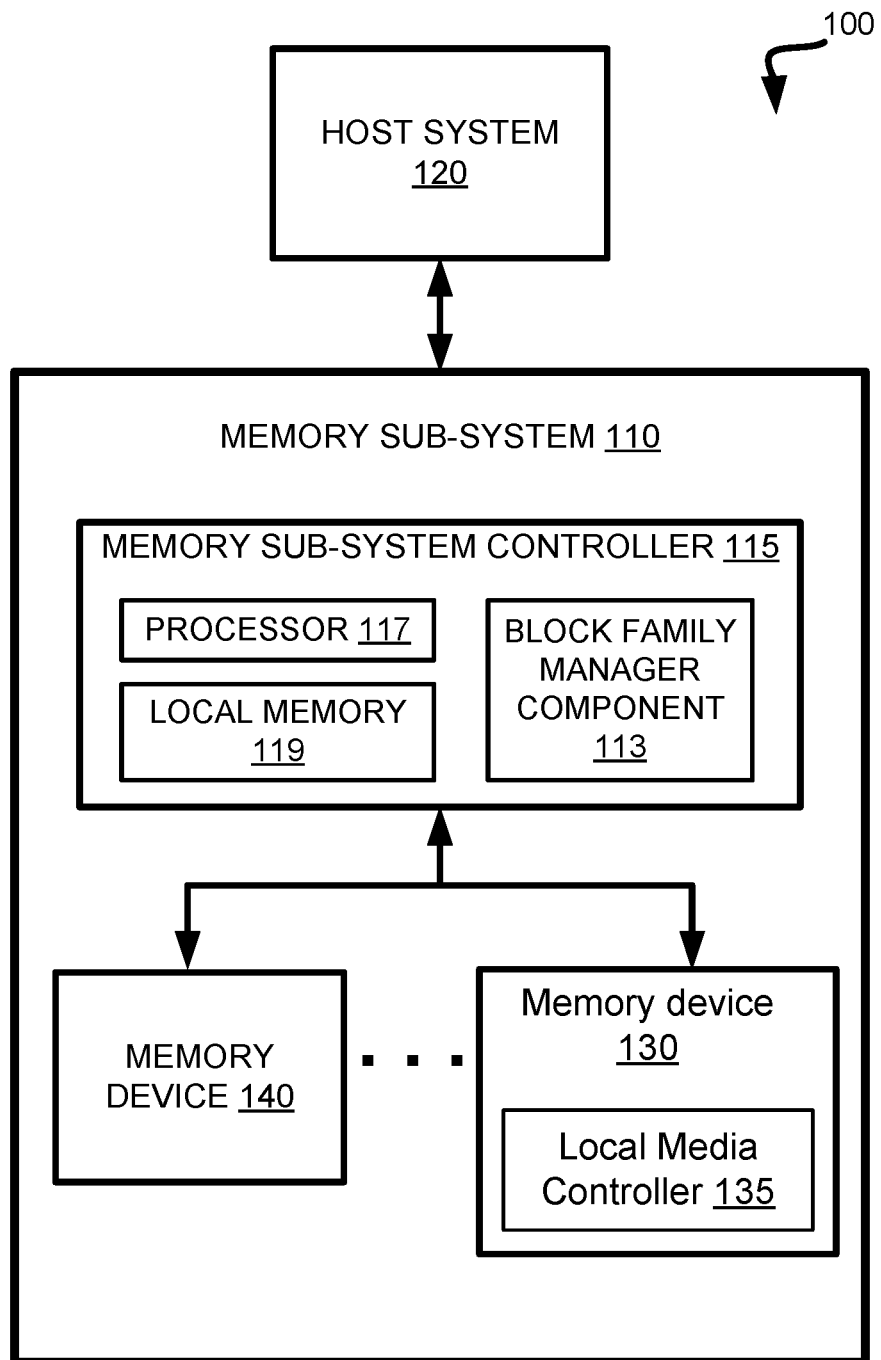
FIG. 1 illustrates an example computing system that includes a memory sub-system in accordance with some embodiments of the present disclosure.

Embodiments of the present disclosure are directed to asynchronous power loss recovery for memory devices. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc.

In order to isolate from the host system various aspects of physical implementations of memory devices employed by memory sub-systems, the memory sub-system can maintain a data structure that maps each LBA to a corresponding physical address (PA). For example, for flash memory, the physical address can include channel identifier, die identifier, page identifier, plane identifier and/or frame identifier. The mapping data structure is referred to herein as a logical-to-physical (L2P) table. The L2P table maintained by the firmware of the memory sub-system controller and is stored on one or more non-volatile memory devices of the memory sub-system. In order to improve the overall efficiency of the data transfer between a host system and a memory sub-system, the L2P table can at least partially be cached by one or more volatile memory devices of the memory sub-system. The memory sub-system controller may implement appropriate cache management policies in order to manage eviction of cache entries.

An asynchronous power loss (APL) event may occur when at least some of dirty cache entries have not yet been written to the underlying non-volatile memory device, thus possibly leaving the L2P table in a state which is inconsistent with the state of memory devices. Accordingly, effective APL recovery strategies should be able to reconstruct the L2P table to a consistent state.

In some implementations, in anticipation of a possible APL event, the memory sub-system controller can repeatedly save snapshots of the L2P table (e.g., upon writing a certain number of data pages), such that the latest snapshot before the APL event would be used for APL recovery. However, such a snapshot would not reflect the L2P table updates that might have occurred between the last L2P table dump time (i.e., the time of saving the last snapshot) and the time of the APL event. Accordingly, the memory sub-system controller can further maintain a journal of recent L2P updates, which may be utilized for replaying the L2P operations that might have occurred between the last L2P table dump time and the APL event. Thus, assuming that the whole L2P table can be stored in a volatile memory, the APL recovery may involve restoring the latest L2P table snapshot followed by replaying the journaled L2P updates for the period starting at the time of saving the last snapshot. Notably, increasing the frequency of L2P table dumps, while reducing the APL recovery time, may increase the write amplification (WA) rate (i.e., the ratio of the total number of bytes written to the number of use data bytes written, which usually is greater than one due to the difference in the granularity of write and erase operations caused by the fact that a page should be erased before it can be written to, while an erase operation may only be performed on a whole block comprising multiple pages, even if a single page of data needs to be erased).

Thus, for a memory sub-systems having its entire L2P table resident in RAM, a constant WA rate may be provided by dumping L2P table regions in a round-robin fashion at a predetermined rate. In an illustrative example, the L2P table dump may be performed every predetermined number of bytes of host writes and/or garbage collection (GC) writes.

However, if the L2P table is only partially cached in a non-volatile memory due to the size constraints, replaying the journaled L2P updates may involve performing multiple non-volatile memory read and write operations, since the journaled L2P updates may be related to any LBAs and may occur in any order. However, various common APL recovery strategies fail to adequately address the partial caching of the L2P table, thus resulting in high APL recovery times and/or high WA rates.

Embodiments of the present disclosure address the above-noted and other deficiencies by implementing a memory sub-system that employs an L2P dumping strategy based on the combination of the data page write count and the L2P table cache miss count. In accordance with embodiments of the present disclosure, the memory sub-system controller may maintain a counter of data page writes and a counter of L2P cache misses in order to determine the L2P dump rate based on the combination (e.g., a weighted sum) of the two counters, as described in more detail herein below. Therefore, advantages of the systems and methods implemented in accordance with some embodiments of the present disclosure include, but are not limited to, improving the efficiency of L2P snapshotting and journaling operations by balancing the APL recovery times and WA rates.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device (e.g., a processor).

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point array of non-volatile memory cells and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAIVI), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes an APL recovery manager component 113 that can be used to implement the APL recovery strategies based on L2P dump operations performed in accordance with embodiments of the present disclosure. In some embodiments, the controller 115 includes at least a portion of the APL recovery manager component 113. For example, the controller 115 can include a processor 117 (processing device) configured to execute instructions stored in local memory 119 for performing the operations described herein. In some embodiments, the APL recovery manager component 113 is part of the host system 120, an application, or an operating system. The APL recovery manager component 113 can manage the L2P table snapshotting and APL recovery operations, as described in more detail herein below.

Figure 2:
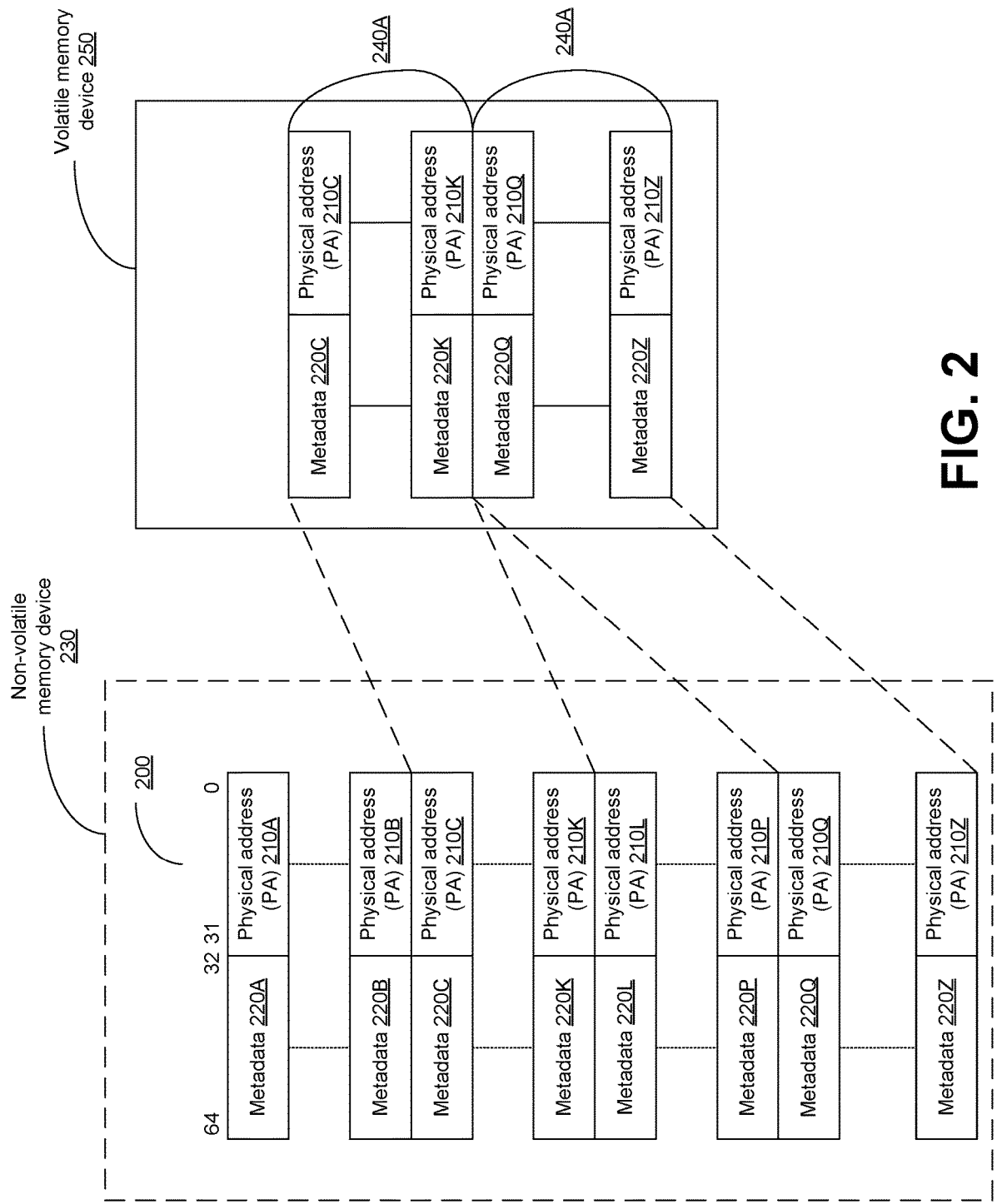
FIG. 2 schematically illustrates an example L2P caching scheme implemented by a memory sub-system controller operating in accordance with embodiments of the present disclosure.

FIG. 2 schematically illustrates an example L2P caching scheme implemented by a memory sub-system controller operating in accordance with embodiments of the present disclosure. As shown in FIG. 2, the L2P table 200 is indexed by the LBA value, such that i-th entry of the L2P table 200 stores the physical address (PA) 210 corresponding to LBA=i and further stores one or more metadata values 220 (such as power-on reset count, etc.). In some implementations, the PA field 210 can store the result of applying the exclusive disjunction (exclusive or, XOR) operation to the PA and LBA (i.e., PA ^ LBA), thus reserving the binary value of all "ones" (0xFFFFFFFF) for unmapped LBAs. While in the illustrative example of FIG. 2, the L2P table entry has the size of 8 bytes, including 4 bytes allocated to the PA and 4 bytes allocated to the metadata, in various other implementations, L2P map entries and/or their individual fields of other sizes can be implemented.

The L2P table 200 may be stored on one or more non-volatile memory devices 230. In operation, the memory sub-system controller may cause one or more regions 240A-240N of the L2P table 200 to be cached on the volatile memory device (e.g., static random access memory (SRAM) device) 250. The L2P regions may be dumped to a non-volatile memory (e.g., in a round robin fashion) during run-time and effectively determine the starting point of an eventual APL reconstruction operation.

Since an L2P cache miss results in a memory page read (and potentially a page write as well) from a non-volatile memory device (e.g., a NAND memory device), and furthermore is likely to result in additional memory page read/write during the APL reconstruction procedure, the memory subsystem controller may take into account the number of L2P cache misses in determining the L2P dump frequency. Accordingly, the memory sub-system controller may maintain a counter of data page writes and a counter of L2P cache misses.

In an illustrative example, responsive to determining that a certain function of the counter values exceeds a predetermined or dynamically adjusted threshold value, the memory subsystem controller may dump one or more cached L2P regions onto one or more non-volatile memory devices. Taking into account both the page writes and cache miss operations effectively limits the number of journal pages and data pages that will have to be read during the reconstruction time.

In some embodiments, the combination of counters may be represented by a weighted sum of the values of the counter of data page writes and the counter of L2P cache misses:

$$D = w_1 * c_1 + w_2 * c_2$$

where D is the combined value to be compared to the predetermined or dynamically adjusted threshold, $c_1$ is the counter of data page writes (e.g., user data writes and garbage collection (GC) page writes), $c_2$ is the counter of L2P cache misses, and $w_1$, $w_2$ are weight coefficients.

In another illustrative example, the memory subsystem controller may dump one or more cached L2P regions responsive to determining that both counters exceed their respective threshold values:

$$c_1 > T_1 \text{ and } c_2 > T_2$$

where $T_1$ and $T_2$ are threshold values for the counter $c_1$ of data page writes and the counter $c_2$ of L2P cache misses, respectively.

In yet another illustrative example, the memory subsystem controller may dump one or more cached L2P regions responsive to determining that at least one of the two counters exceed their respective threshold values:

$$c_1 > T_1 \text{ or } c_2 > T_2.$$

Since increasing L2P dump increases the write amplification while decreasing the reconstruction time, the threshold values of the counters and/or the weight coefficients may be calculated to provide a requisite balance between the WA rate and the reconstruction time. In an illustrative example, the memory sub-system controller may utilize pre-set values of the threshold values of counters and/or preset values of the weight coefficients. Alternatively, the memory sub-system controller may adjust the threshold values of the counters and/or the values of the weight coefficients in order to provide the requisite WA rate and/or the requisite reconstruction time.

Figure 3:
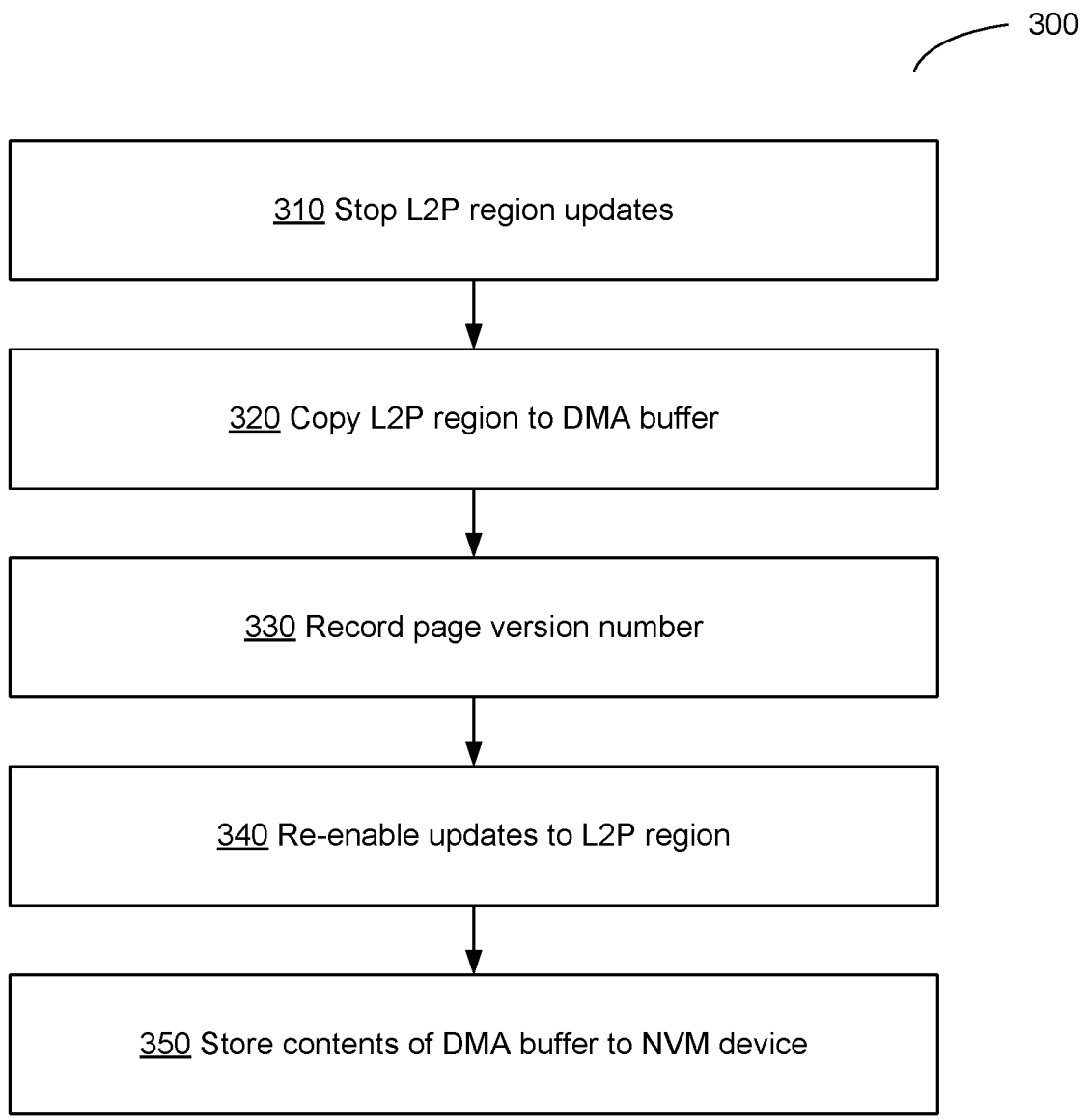
FIG. 3 is a flow diagram of an example method of L2P region dumping implemented by a memory sub-system controller operating in accordance with embodiments of the present disclosure.

FIG. 3 is a flow diagram of an example method 300 of L2P region dumping implemented by a memory sub-system controller operating in accordance with embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the APL recovery manager component 113 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

Notably, L2P region dumps are not coordinated with L2P journal dumps. This may result in some L2P journals containing information that is already contained in the L2P region, but replay of those L2P journals on top of the L2P entries will still result in the correct mapping.

At operation 310, the processing device of the memory sub-system controller stops the updates to the L2P region.

At operation 320, the processing device copies the L2P region into a direct memory access (DMA) buffer to be utilized for memory write operations on a non-volatile memory device.

At operation 330, the processing device records the page version number of the L2P region, for determining whether it is safe to dump the metadata (info) page, as described in more detail herein below.

At operation 340, the processing device re-enables the updates to the L2P region.

At operation 350, the processing device causes the contents of the DMA buffer to be written to a non-volatile memory device, and the method may terminate.

The above-referenced "info page" is a container for multiple flash translation layer (FTL) metadata tables. Notably, the info page may span multiple pages. The info page may include the following metadata: the L1 mapping table for L2P regions, which points to all actual L2P regions on the memory device; a pointer to the most recently dumped block info table on the memory device; the state of each superblock; valid translation unit counter (VTC); a pointer to the oldest L2P region on the memory device.

The info page dump defines which L2P regions will be used as the basis for replay. In an illustrative example, if an L2P region is written to a non-volatile memory device, but the relevant info page has not been dumped, that L2P region will not be used as a basis for replay. Accordingly, the info page may be dumped at a pre-determined or dynamically adjusted rate during the run-time.

Figure 4:
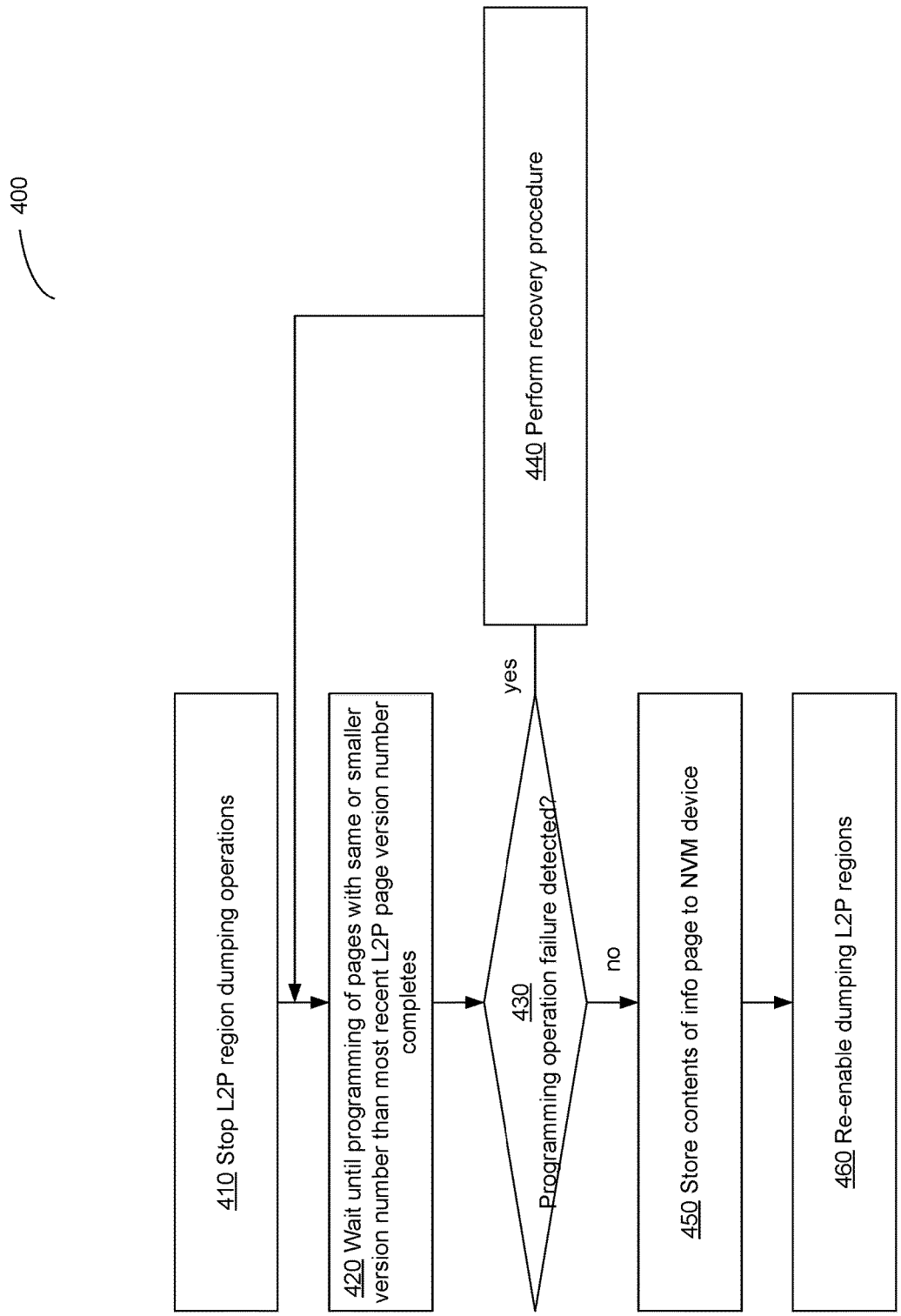
FIG. 4 is a flow diagram of an example method of info page dumping implemented by a memory sub-system controller operating in accordance with embodiments of the present disclosure.

FIG. 4 is a flow diagram of an example method 400 of info page dumping implemented by a memory sub-system controller operating in accordance with embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the APL recovery manager component 113 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 410, the processing device of the memory sub-system controller stops L2P region dumping operations.

At operation 420, the processing device waits until programming operations would be completed for all pages with a smaller or equal version number than the most recent L2P page version number.

Responsive to detecting, at operation 430, a programming operation failure, the processing device may initiate a failure recovery procedure (operation 440), upon the completion of which the method may loop back to operation 420.

At operation 450, the processing device dumps the info page to a non-volatile memory device.

At operation 460, the processing device re-enables dumping of L2P regions, and the method terminates.

Notably, this info page dumping method does not require suspension of new write operations, as the write operations that occur while the controller is waiting for programming operation completion will be reflected in the next L2P region dump and info page dump.

Figure 5:
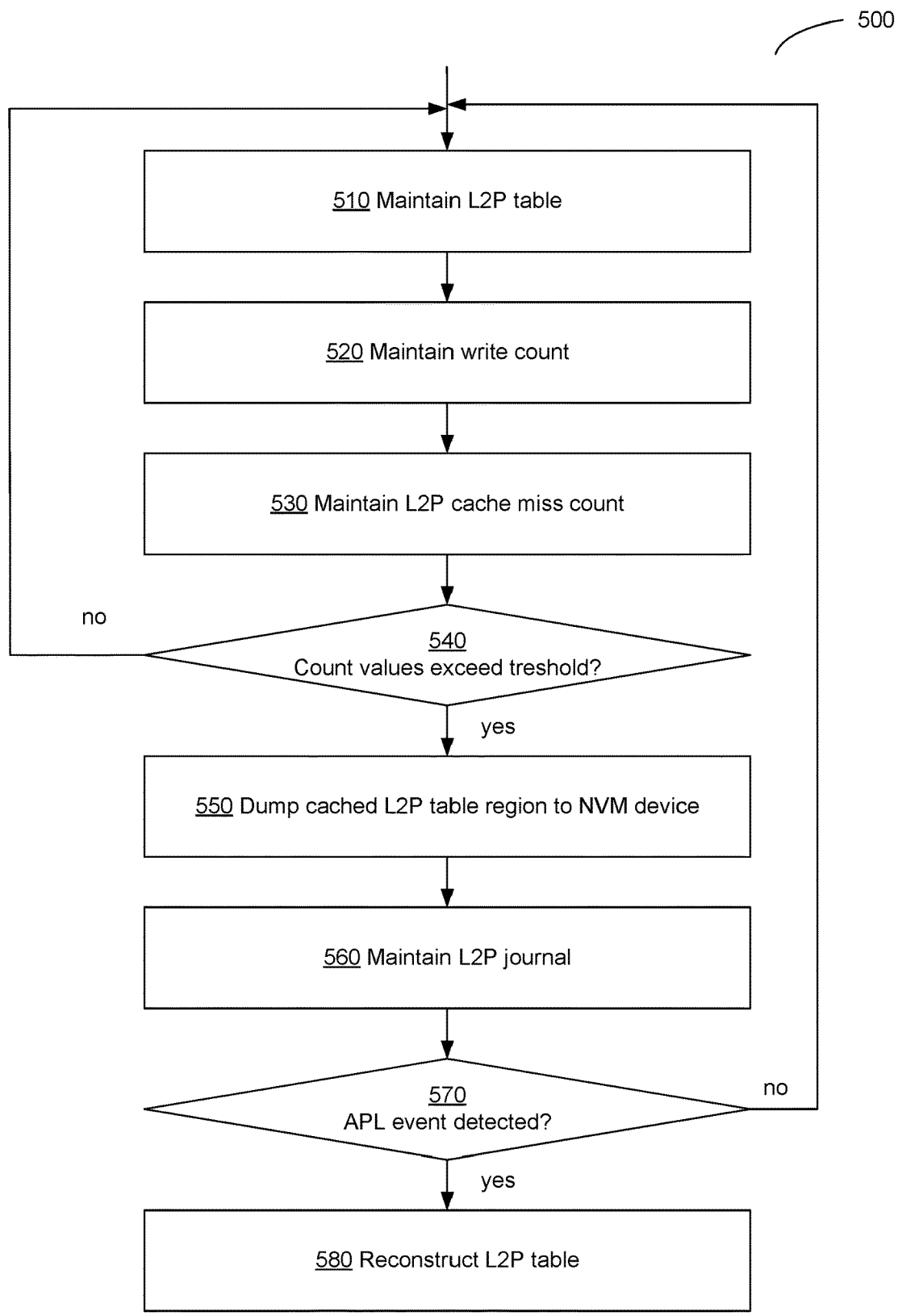
FIG. 5 is a flow diagram of an example method of run-time L2P table dumping, implemented by a memory sub-system controller operating in accordance with embodiments of the present disclosure.

FIG. 5 is a flow diagram of an example method 500 of run-time L2P table dumping implemented by a memory sub-system controller operating in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the APL recovery manager component 115 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 510, the processing device of the memory sub-system controller maintains a logical-to-physical (L2P) table, one or more regions of which are cached in a volatile memory, as described in more detail herein above.

At operation 520, the processing device maintains a write count reflecting a number of bytes written to the memory device, as described in more detail herein above.

At operation 530, the processing device maintains a cache miss count reflecting a number of cache misses with respect to a cache of the L2P table, as described in more detail herein above.

Responsive to determining, at operation 540, that a value of a predetermined function of the write count and the cache miss count exceeds a threshold value, the processing device, at operation 550, copies the region of the L2P table to a non-volatile memory, as described in more detail herein above.

At operation 560, the processing device maintains an L2P journal, such that each L2P journal entry reflects an update operation with respect to the L2P table.

Responsive to detecting, at operation 570, an APL event, the processing device, at operation 580, reconstructs the L2P table. Reconstructing the L2P table involves replaying the L2P journal entries on top of the L2P table regions. The reconstruction procedure processes all valid journal entries before moving to pages containing host data for the last portion of replay (i.e., reading data pages that were written but not covered by a journal and extracting the translation units (TU) from the metadata stored by the data pages.

Figure 6:
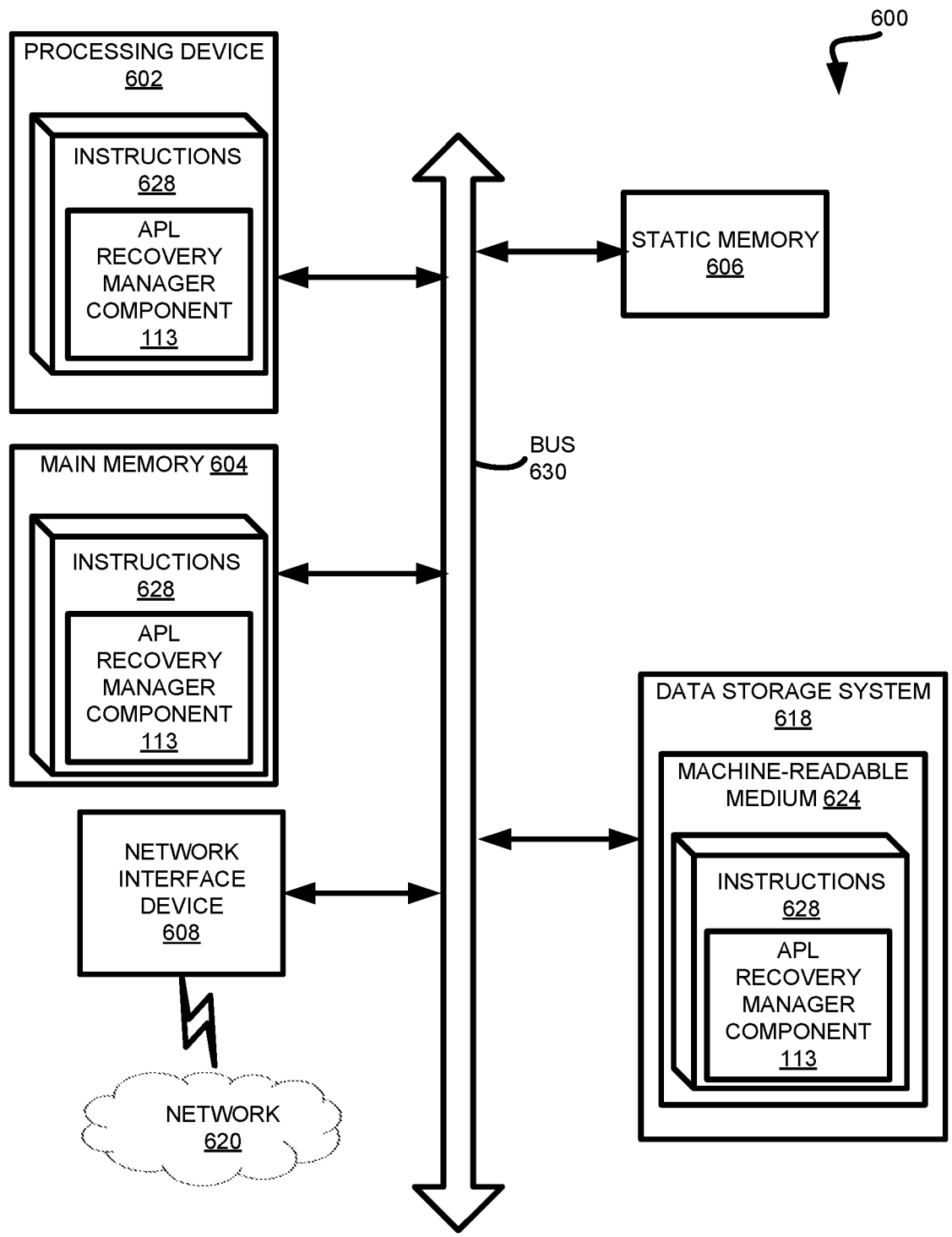
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 16 of FIG. 1) or can be used to perform the operations of a controller (e.g., to execute an operating system to perform operations corresponding to the APL recovery manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 628 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 628 or software embodying any one or more of the methodologies or functions described herein. The instructions 628 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 16 of FIG. 1.

In one embodiment, the instructions 628 include instructions to implement functionality corresponding to the APL recovery manager component 113 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
 a memory device; and
 a processing device, operatively coupled to the memory device, the processing device to:
  maintain a logical-to-physical (L2P) table, wherein a region of the L2P table is cached in a volatile memory;
  maintain a write count reflecting a number of bytes written to the memory device;
  maintain a cache miss count reflecting a number of cache misses with respect to a cache of the L2P table;
  responsive to determining that a value of a predetermined function of the write count and the cache miss count exceeds a threshold value, copy the region of the L2P table to a non-volatile memory.

2. The system of claim 1, wherein the processing device is further to:
 store, in the non-volatile memory, a metadata page associated with the region of the L2P table.

3. The system of claim 1, wherein the write count is a sum of a first number of bytes written by a host to the memory device and a second number of bytes written by a garbage collector (GC) process to the memory device.

4. The system of claim 1, wherein the processing device is further to:
reconstruct the L2P table after an asynchronous power loss (APL) event.

5. The system of claim 1, wherein the processing device is further to:
maintain an L2P journal comprising a plurality of L2P journal entries, wherein each L2P journal entry reflects an update operation with respect to the L2P table.

6. The system of claim 1, wherein the threshold value is calculated to keep a reconstruction time of the L2P table below a specified time threshold.

7. The system of claim 1, wherein the threshold value is calculated to keep a write amplification (WA) rate of the memory device below a specified WA threshold.

8. A method comprising:
maintaining, by a controller managing a memory device, a logical-to-physical (L2P) table, wherein a region of the L2P table is cached in a volatile memory;
maintaining a write count reflecting a number of bytes written to the memory device;
maintaining a cache miss count reflecting a number of cache misses with respect to a cache of the L2P table;
responsive to determining that a value of a predetermined function of the write count and the cache miss count exceeds a threshold value, copying the region of the L2P table to a non-volatile memory.

9. The method of claim 8, further comprising:
storing, in the non-volatile memory, a metadata page associated with the region of the L2P table.

10. The method of claim 8, wherein the write count is a sum of a first number of bytes written by a host to the memory device and a second number of bytes written by a garbage collector (GC) process to the memory device.

11. The method of claim 8, further comprising:
reconstructing the L2P table after an asynchronous power loss (APL) event.

12. The method of claim 8, further comprising:
maintaining an L2P journal comprising a plurality of L2P journal entries, wherein each L2P journal entry reflects an update operation with respect to the L2P table.

13. The method of claim 8, wherein the threshold value is calculated to keep a reconstruction time of the L2P table below a specified time threshold.

14. The method of claim 8, wherein the threshold value is calculated to keep a write amplification (WA) rate of the memory device below a specified WA threshold.

15. A computer-readable non-transitory storage medium comprising executable instructions that, when executed by a processing device, cause the processing device to:
maintain a logical-to-physical (L2P) table, wherein a region of the L2P table is cached in a volatile memory;
maintain a write count reflecting a number of bytes written to a memory device;
maintain a cache miss count reflecting a number of cache misses with respect to a cache of the L2P table;
responsive to determining that a value of a predetermined function of the write count and the cache miss count exceeds a threshold value, copy the region of the L2P table to a non-volatile memory.

16. The computer-readable non-transitory storage medium of claim 15, further comprising executable instructions that, when executed by the processing device, cause the processing device to:
store, in the non-volatile memory, a metadata page associated with the region of the L2P table.

17. The computer-readable non-transitory storage medium of claim 15, wherein the write count is a sum of a first number of bytes written by a host to the memory device and a second number of bytes written by a garbage collector (GC) process to the memory device.

18. The computer-readable non-transitory storage medium of claim 15, further comprising executable instructions that, when executed by the processing device, cause the processing device to:
reconstruct the L2P table after an asynchronous power loss (APL) event.

19. The computer-readable non-transitory storage medium of claim 15, wherein the processing device is further to:
maintain an L2P journal comprising a plurality of L2P journal entries, wherein each L2P journal entry reflects an update operation with respect to the L2P table.

20. The computer-readable non-transitory storage medium of claim 15, wherein the threshold value is calculated to keep, below a specified threshold, one of: a reconstruction time or a write amplification (WA) rate of the memory device.

* * * * *